United States Patent Office 3,522,241
Patented July 28, 1970

3,522,241
SUBSTITUTED TRIAZEPINE COMPOUNDS AND IMPROVED METHOD FOR THEIR SYNTHESIS
Stanley J. Strycker, Midland, Mich., assignor to The Dow Chemical Company, Midland, Mich., a corporation of Delaware
No Drawing. Filed June 19, 1967, Ser. No. 647,183
Int. Cl. C07d 55/54; A01n 9/22
U.S. Cl. 260—239
12 Claims

ABSTRACT OF THE DISCLOSURE

The present invention is directed to certain substituted triazepine compounds and to an improved method for the synthesis of these, as well as other substituted triazepine compounds.

---

The improved method of synthesis is a method for the synthesis of a substituted triazepine compound of the formula:

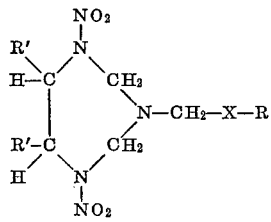

wherein X represents oxygen or sulfur, R represents loweralkyl of from 1 to 4, both inclusive, carbon atoms, allyl, propynyl, cyclohexyl, phenethyl, or a phenyl radical of the formula

wherein $m$ represents an integer of from 0 to 3, both inclusive, and each Y independently represents bromo, chloro, methyl, or methoxy; and each R' independently represents hydrogen or methyl.

The method comprises the step of reacting a dimethylol compound of the formula:

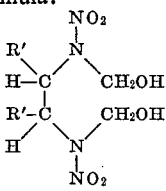

essentially simultaneously with (1) formaldehyde; (2) ammonia; and (3) an alcohol or thiol of the formula H—X—R.

Of the products produced by the improved method of synthesis, the present invention claims as new compounds those of the following formula:

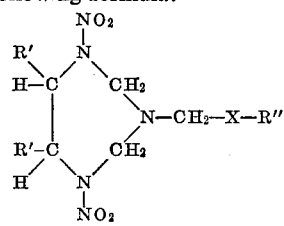

wherein R" represents allyl, propynyl, cyclohexyl, phenethyl, or a phenyl radical as above defined. Those of the products synthesized by the present improved process wherein R represents loweralkyl and X represents oxygen are known in the art (U.S. Pat. 3,280,107) to be useful as agents to alter and modify the growth of plants. The remaining products synthesized by the present process are similarly useful as agents to alter and modify the growth of plants.

BACKGROUND OF THE INVENTION

In accordance with the prior art (Myers et al., Can. J. Res., 27B, page 489 (1949) and Bell et al., J. Chem. Soc., 1966, page 863), certain compounds of the general formula

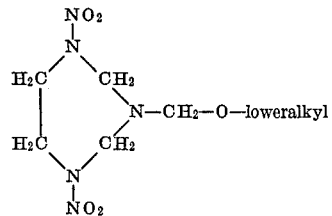

are prepared by a multi-step reaction sequence. This sequence and the yields reported for each of the steps are presented in the following diagram:

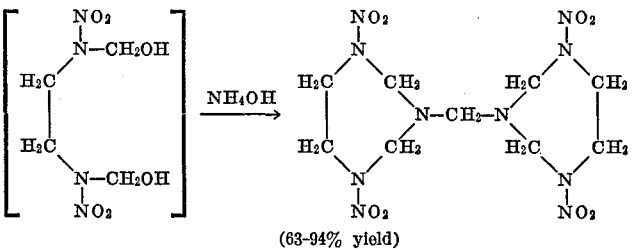

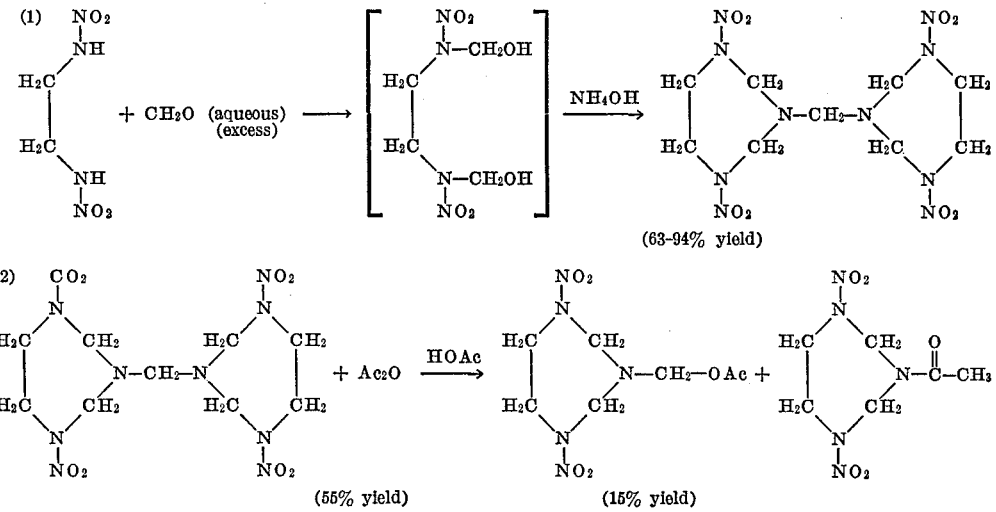

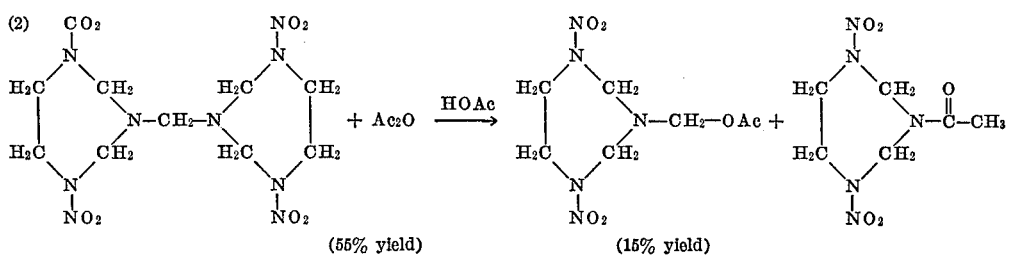

(3)

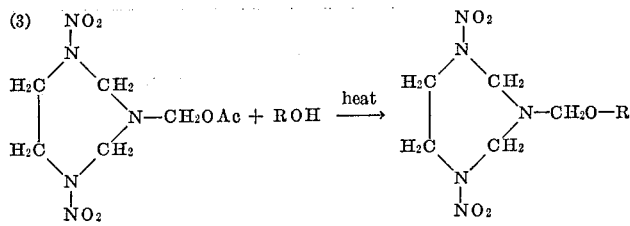

(97% yield where R=CH₃;
75% yield where R=C₂H₅)

Assuming optimum individual yields, the highest overall yield (i.e., yield based on the starting dinitramine of reaction 1 above) possible is 49.6 percent. In actual practice, especially if a product of higher purity is required, necessitating repeated purification steps to remove byproducts, yields generally run considerably lower. Moreover, because of the plurality of steps, each with separate product workup, preparation of the ultimate product by this method requires excessive time and effort.

SUMMARY OF THE INVENTION

There has now been discovered an improved method for the synthesis of the final product of the above described reaction sequence.

The improved method consists of the reaction of the dimethylol compound (the bracketed compound in Reaction 1 above) essentially simultaneously with (1) formaldehyde; (2) ammonia; and (3) an alcohol or thiol of the formula H—X—R; reaction results in the final product of Reaction 3 above. Water is produced as the only byproduct. Moreover, since the dimethylol compound need not be separated from the reaction mixture, and in fact cannot be separated from the reaction mixture without its modification into other compounds, the present improved process makes possible the preparation of the final product in a single reaction mixture.

The reaction in accordance with the present improved process results in high yields. In some instances, the overall crude yield approaches 100 percent. In addition, the reaction is simplified and handling problems considerably reduced; and the product is obtained, even without recrystallization, or other purification step, in a high degree of purity.

Furthermore, it has been found that the improved process can be used to prepare yet other related compounds.

Thus, as set forth hereinabove in the abstract, the improved process comprises a method for the synthesis of a compound of the formula

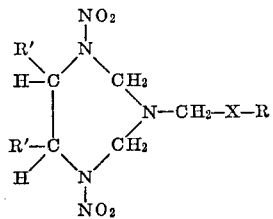

wherein X represents oxygen or sulfur, R represents loweralkyl of from 1 to 4, both inclusive, carbon atoms, allyl, propynyl, cyclohexyl, phenethyl, or a phenyl radical of the formula

wherein m represents an integer of from 0 to 3, both inclusive, and each Y independently represents bromo, chloro, methyl, or methoxy; and each R' independently represents hydrogen or methyl; and the method comprises the step of reacting a dimethyl compound of the formula:

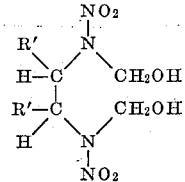

essentially simultaneously with (1) formaldehyde; (2) ammonia; and (3) an alcohol or thiol of the formula H—X—R. In a preferred embodiment, the present process comprises the preparation of the dimethylol compound in situ by the reaction of formaldehyde with the corresponding dinitramine:

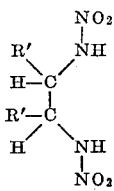

Certain of the products prepared by the present process

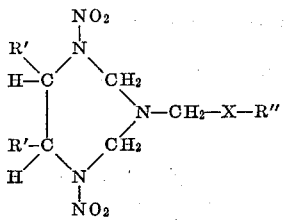

wherein R'' represents allyl, propyl, cyclohexyl, phenethyl, or a phenyl radical as above defined, are claimed herein as novel compounds. These products, as well as all other products prepared in accordance with the improved method of the present invention, are useful as agents to alter and modify the growth of plants.

It is noted that the term "loweralkyl" is employed herein to designate an alkyl radical being of from 1 to 4, both inclusive, carbon atoms.

DETAILED DESCRIPTION OF THE PREFERRED EMBODIMENTS

The reaction of dimethylol compound

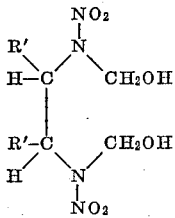

essentially simultaneously with (1) formaldehyde; (2) ammonia; and (3) alcohol or thiol of the formula H—X—R is conveniently carried out in the presence of an inert liquid reaction medium. The identity of the reaction medium is not critical—any liquid which is a solvent for one or more of the reactants can be employed. More than one liquid can be used. Suitable liquids include chloroform, ethyl acetate, loweralkanols, tetrahydrofuran, dimethylformamide, dimethyl sulfoxide, and water, such as the water of formalin employed to prepare the dimethylol compound.

The identity of the particular agent used to supply the ammonia is not critical, it being necessary only that the ammonia be available for reaction. The ammonia can be supplied as a gas bubbled into a reaction medium containing the dimethylol compound and alcohol or thiol reactant. Alternately, the ammonia can be supplied as a solution thereof with a suitable solvent, for example, dimethylformamide or especially, water. Also, the ammonia can be supplied in the form of a salt thereof; for this embodiment, the preferred salts are ammonium salts of weak acids, i.e., those having a pKa of about 2 or higher. Ammonium acetate is a suitable and readily available such salt. Finally, the ammonia can be supplied by using a substance which readily breaks down under relatively mild conditions to ammonia; hexamethylenetetramine is such a substance.

The amounts of the reactants employed are not critical, some of the desired product being obtained when employing the reactants in any amounts. However, in order that the final product be obtained in good yield, it is generally necessary that the reactants at least be employed in amounts reflecting those consumed in the reaction; or, preferably, that the reactants be employed in amounts representing the preferred ratios, in accordance with the improved process of the present invention.

The reaction consumes the reactants in amounts representing equimolecular proportions of dimethylol compound, formaldehyde, ammonia, and H—X—R reactant, or one molecular proportion of ammonia, H—X—R reactant, and starting dinitramine compound and three molecular proportions of formaldehyde. However, yet higher yields are obtained when employing excess formaldehyde, such as from three to ten molecular proportions, and excess H—X—R reactant, such as from one to ten, and preferably eight to ten, molecular proportions.

The temperature at which the reaction is conducted is not critical: the reaction goes forward at temperatures from the freezing point of the solvent to the boiling point of the solvent. Generally, room temperatures are employed, with deviations therefrom to enhance solubility, as in the reaction of dinitramine and formaldehyde, or to decrease solubility, as in the separation of the product from the reaction mixture.

The exact form in which the formaldehyde is supplied is not critical; generally, an aqueous solution of formaldehyde is more conveniently handled and for that reason is preferred. Gaseous formaldehyde can be employed, however, whenever an inert liquid is employed as a reaction medium.

In carrying out the reaction, the dimethylol compound is contacted, essentially simultaneously, with the formaldehyde, ammonia, and H—X—R reactant. The reaction goes forward readily, although yields are enhanced by permitting the reaction mixture to stand for a period of time. Separation of the product, and, if desired, its purification, is achieved in conventional procedures, typically filtration and recrystallization, respectively.

In the practice of the preferred embodiment of the present invention, the starting dinitramine compound is reacted initially with formaldehyde, and the resulting plete or essentially complete conversion of the dinitramine reaction mixture held for a period of time to assure compound to the corresponding dimethylol compound. Thereafter, to the same reaction mixture, there is added essentially simultaneously the source of ammonia and H—X—R reactant, and, if excess formaldehyde was not earlier used, additional formaldehyde, and the reaction is thereafter carried out as previously discussed.

Those products obtained from the present invention and being of the formula

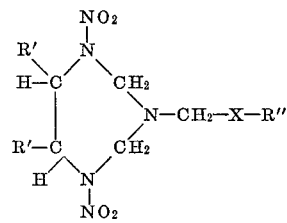

are novel compounds, typically—as the other products of the present improved process—crystalline solid substances. They are useful as agents to alter and modify the growth of plants.

The products claimed hereinbelow can also be prepared in an alternate method which comprises the reaction of a dinitramine compound as above defined with formaldehyde and an amine compound of the formula $$H_2N-CH_2-X-R''$$

The reaction consumes the reactants in amounts representing one molecular proportion of each of the amine and dinnitramine compounds and two molecular proportions of formaldehyde, but better results are obtained when employing the formaldehyde in excess. Preferably, formaldehyde is employed in aqueous solution, such as the 37 percent aqueous solution known as formalin, in which instance the solution serves as a diluent for all of the reactants. The reaction goes forward at temperatures of from −15° to 100° C., but is preferably carried out at temperatures of from 5° to 25° C. Separation and purification are carried out in conventional procedures.

The following examples illustrate the present invention in the improved process and in the new products and will enable those skilled in the art to practice the same.

EXAMPLE 1

Preparation of 3-(ethoxymethyl)-1,5-dinitrohexahydro 1,3,5-triazepine

N,N'-dinitroethylenediamine (7.5 grams; 0.05 mole) and formalin (40 grams, representing 0.5 mole of formaldehyde) were mixed and the mixture warmed on a steam bath until the N,N'-dinitroethylenediamine dissolved.

Fifty milliliters of ethanol were added and the solution was cooled in an ice bath to 10° C. Ammonium acetate (3.9 grams; 0.05 mole) was dissolved in 25 milliliters of water and added slowly to the well stirred reaction mixture. Heat was then applied and the clear, colorless solution was heated to 60° C. and thereafter stirred at 60°–75° C. for a period of one hour. On cooling, the desired 3-(ethoxymethyl)-1,5-dinitrohexahydro-1,3,5- triazepine precipitated in the reaction mixture and was separated therefrom by filtration. The separated product represented an essentially quantitative yield and melted at 159–63° C. It was estimated to be of approximately 95 percent purity. Upon recrystallization from ethanol, it melted at 164–65° C. and was estimated to be of approximately 98 percent purity.

EXAMPLE 2

Preparation of 3-(methoxymethyl)-1,5-dinitrohexahydro-1,3,5-triazepine

N,N'-dinitroethylenediamine (15.0 grams; 0.10 mole) and formalin (40 grams; representing 0.50 mole) were mixed together and the mixture warmed on a steam bath until the N,N'-dinitroethylenediamine had completely dissolved. Thereafter, the solution was diluted with 25 milliliters of water and cooled to 30° C. Ammonium acetate (9.2 grams; 0.12 mole) was dissolved in 100 milliliters of methanol and the resulting solution added all at once to the previous solution. Initially, following the addition, the reaction mixture was cloudy; then it set up solid as a mass of white crystals, the desired 3-(methoxymethyl)-1,5-dinitrohexahydro-1,3,5-triazepine product. The temperature of the reaction mixture rose spontaneously to 45° C., whereupon cooling was begun. At 10° C., the reaction mixture was filtered to separate the product; the product was subsequently air-dried and recrystallized from methanol. The product so obtained melted at 146–47° C. (literature shows 146.5–147.0° C.).

A further recrystallization from methanol was carried out, yielding 13.7 grams of material determined by nuclear magnetic resonance and infrared analyses to be of high purity. This represents an overall yield, based on the starting N,N'-dinitroethylenediamine, of 58 percent of the theoretical yield. Purity was judged to be 98 percent.

EXAMPLE 3

Preparation of 3-((phenylthio)methyl)-1,5-dinitrohexahydro-1,3,5-triazepine

N,N'-dinitroethylenediamine (15 grams; 0.1 mole) and formalin (40.0 grams, representing 0.5 mole of formaldehyde) were mixed and the mixture warmed and filtered. To the filtrate there was added benzenethiol (12 grams; 0.109 mole), a portion of acetone, and ammonium acetate, (9.2 grams; 0.12 mole) dissolved in water. The temperature rose to 37° C., as the reaction mixture was held for a period of one hour. At the end of the one-hour period, water was added to precipitate the desired 3-((phenylthio)methyl)-1,5-dinitrohexahydro-1,3,5 - triazepine compound, which was thereafter separated by filtration in essentially quantitative yield.

The filter cake was slurried with a portion of methylene chloride and subsequently filtered, washed twice with water and again filtered. Thereafter, the solution was concentrated under subatmospheric pressure to obtain the product in purified form. The product so obtained was mixed with 300 milliliters of tetrachloroethylene and the mixture heated to reflux, cooled and decanted, and cooled yet further and filtered.

The product obtained as a result of these operations was a white crystalline substance, M.P. 139.5–140° C., of >98 percent purity.

EXAMPLES 4–21

Other representative products, prepared in accordance with the foregoing teachings and examples, are identified hereinbelow, the symbol "M.W." being used as an abbreviation of the term "molecular weight," and the symbol "M.P." being used as an abbreviation for the symbol "melting point."

Thus, for example, one molecular proportion of N,N'-dinitropropylenediamine is reacted with an excess amount of a 45 percent aqueous formaldehyde solution; thereafter, eight molecular proportions of cyclohexanethiol and an aqueous solution of one molecular proportion of ammonium acetate are added, resulting in the preparation of the desired 3-((cyclohexylthio)methyl)-1,5-dinitro-6-methylhexahydro-1,3,5-triazepine, M.W. 333.4.

One molecular proportion of N,N'-dinitro-ethylenediamine is reacted with an excess amount of formalin; thereafter, one molecular proportion of ammonia is bubbled in, and eight molecular proportions of allyl alcohol are added, yielding 3 - ((allyloxy)methyl-1,5-dinitrohexahydro-1,3,5-triazepine, M.P. 153.5–4° C.

One molecular proportion of N,N'-dinitro-2,3-butanediamine is reacted with an excess amount of formalin; thereafter, one molecular proportion of ammonium acetate and approximately eight molecular proportions of phenol are added, resulting in the preparation of 3-(phenoxymethyl)-1,5 - dinitro - 6,7 - dimethylhexahydro - 1,3,5 - triazepine, M.W. 325.3.

One molecular proportion of N,N'-dinitro-ethylenediamine is reacted with an excess amount of formalin, and thereafter with one molecular proportion of ammonium acetate and eight molecular proportions of 2-propene-1-thiol, yielding 3-((allylthio)methyl)-1,5-dinitrohexahydro-1,3,5-triazepine, M.P. 113–4° C.

One molecular proportion of N,N'-dinitroethylenediamine is reacted with formaldehyde and thereafter with one molecular proportion of ammonium acetate and eight molecular proportions of ethanethiol, yielding 3-( (ethylthio)methyl) - 1,5 - dinitrohxaehydro - 1,3,5 - triazepine, M.W. 265.3.

One molecular proportion of N,N'-dinitroethylenediamine is reacted with formaldehyde, yielding the corresponding N,N' - dinitro - N,N' - bis(hydroxymethyl) - ethylenediamine compound; separately, one molecular proportion of ammonia is bubbled into a quantity of dimethylformamide and eight molecular proportions of p-chlorobenzenethiol added and the resulting solution added to the solution containing the N,N-dinitro-N,N-bis(hydroxymethyl)ethylenediamine; as a result, there is obtained 3-( (p - chlorophenylthio)methyl) - 1,5 - dinitrohexahydro - 1,3,5-triazepine, M.W. 347.8.

One molecular proportion of N,N'-dinitro-ethylenediamine is reacted with an excess of formalin, and thereafter with one molecular proportion of ammonium acetate and eight molecular proportions of cyclohexanol, yielding 3 - ( (cyclohexyloxy)methyl) - 1,5 - dinitrohexa - hydro-1,3,5-triazepine, M.P. 178.5–9.5° C.

One molecular proportion of N,N'-dinitroethylenediamine is reacted with an excess amount of formalin; thereafter, one molecular proportion of ammonium acetate and eight molecular proportions of 2-butanethiol are added, yielding 3 - ( (sec-butylthio)methyl) - 1,5-dinitrohexahydro-1,3,5-triazepine, M.W. 293.4.

One molecular proportion of N,N'-dinitroethylenediamine is reacted with an excess of formalin, and thereafter with one molecular proportion of ammonium acetate and nine molecular proportions of 2,4,5-trichlorophenol, yielding 3 - ( (2,4,5 - trichlorophenoxy) - methyl) - 1,5 - dinitrohexahydro - 1,3,5 - triazepine, M.W. 400.6.

One molecular proportion of N,N'-dinitroethylenediamine is reacted with an excess of formalin, and thereafter with one molecular proportion of ammonium acetate and eight molecular proportions of 2-propyn-1-ol, yielding 3 - ( (propynyloxy)methyl) - 1,5 - dinitrohexahydro - 1,3,5 - triazepine, M.P. 155–6° C.

One molecular proportion of N,N'-dinitropropylenediamine is reacted with an excess amount of 50 percent aqueous formaldehyde, and thereafter there is added one molecular proportion of ammonium acetate and eight molecular proportions of 2-propene-1-thiol, yielding 3-( (allylthio)methyl) - 1,5 - dinitro - 6 -methylhexahydro - 1,3,5-triazepine, M.W. 291.3.

One molecular proportion of N,N'-dinitropropylenediamine is reacted with an excess of formalin, and thereafter with one molecular proportion of ammonium acetate and ten molecular proportions of 5-bromo-m-cresol, yielding 3 - ( (bromo-m-tolyloxy)methyl) - 1,5 - dinitro - 6-methylhexahydro-1,3,5-triazepine, M.W. 404.2.

One molecular proportion of N,N'-dinitroethylenediamine is reacted with an excess of formalin, and thereafter with one molecular proportion of ammonium acetate and eight molecular proportions of isopropanol, yielding 3 - (isopropoxymethyl) - 1,5 -dinitrohexahydro - 1,3,5-triazepine, M.P., 182–3° C.

One molecular proportion of N,N'-dinitro-2,3-butanediamine is reacted with an excess amount of formalin; thereafter, one molecular proportion of ammonium acetate and eight molecular proportions of 2-propyene-1-thiol, yielding 3-( (propynylthio)methyl)-1,5-dinitro-6,7-dimethylhexahydro-1,3,5-triazepine, M.W., 303.4.

One molecular proportion of N,N'-dinitroethylenediamine is reacted successively with excess formalin, one molecular proportion of ammonium acetate, and eight molecular proportions of 3,4,5-trimethoxyphenol, yielding 3 - ( (3,4,5 - trimethoxyphenoxy)methyl) - 1,5 - dinitrohexahydro-1,3,5-triazepine, M.W., 387.4.

One molecular proportion of each of N,N'-dinitroethylenediamine and n-propoxymethylamine are reacted together in excess formalin, yielding 3-(n-propoxymethyl)-1,5-dinitrohexahydro-1,3,5-triazine, M.P. 139–140° C.

One molecular proportion of N,N'-dinitroethylenediamine is reacted successively with excess formalin, one molecular proportion of ammonium acetate, and eight molecular proportions of 2-bromo-4-chlorobenzenethiol, yielding 3 -( (2 - bromo - 4 - chlorophenylthio)methyl) - 1,5 - dinitrohexahydro - 1,3,5 -triazepine, M.W. 426.7.

One molecular proportion of N,N'-dinitroethylenediamine is reacted successively with excess formalin and with one molecular proportion of ammonium acetate and eight molecular proportions of 2-phenylethanol, yielding 3 - (phenethoxymethyl) - 1,5 - dinitrohexahydro - 1,3,5 - triazepine, M.P., 116.5–8° C.

The products of the present invention, as noted foregoing, are useful as agents to alter and modify the growth of plants. In such embodiments, the unmodified compounds can be used. Preferably, however, compositions comprising the compounds are employed. For example, the compounds can be dispersed on a finely divided solid and employed as dusts. Also, such mixtures can be dispersed in water with the aid of a wetting agent and the resulting aqueous suspensions employed as sprays. In other procedures, the products can be employed as constituent fo organic liquid solutions, oil-in-water or water-in-oil emulsions or water dispersions with or without the addition of wetting, dispersing or emulsifying agents.

In representative procedures, an amount of standard microbiological culture medium was mixed with 3-((propynyloxy)methyl)-1,5-dinitrohexahydro - 1,3,5-triazepine to obtain a test medium containing the compound in the amount of 0.05 percent by weight. Thereafter, the test medium and an amount of unmodified culture medium, the latter serving as a control, were each separately inoculated with *Bacillus subtilis*, and the media thereafter held under conditions conducive to the growth of the organism. Observations made at twenty-four and forty-eight hours after inoculation showed complete inhibition of *Bacillus subtilis* in the test medium, whereas there was present in the control medium an abundant growth of *Bacillus subtilis*. The same results were obtained when separately evaluating the following compounds: 3-((allyloxy)methyl) - 1,5 - dinitrohexahydro-1,3,5-triazepine; 3-(propoxymethyl) - 1,5 - dinitrohexahydro-1,3,5-triazepine; 3-((allylthio)methyl-1,5-dinitrohexahydro - 1,3,5 - triazepine; 3-((phenylthio)methyl) - 1,5-dinitrohexahydro-1,3,5-triazepine; 3 - ((cyclohexyloxy) methyl)-1,5-dinitrohexahydro - 1,3,5 - triazepine; and 3-(phenethoxymethyl) - 1,5 - dinitrohexahydro - 1,3,5-triazepine.

I claim:

1. A method for the preparation of a compound of the formula

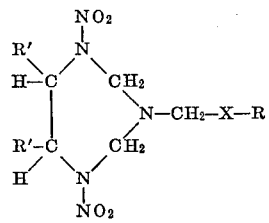

wherein X represents oxygen or sulfur; R represents loweralkyl of from 1 to 4, both inclusive, carbon atoms, allyl, propynyl, cyclohexyl, phenethyl, or a phenyl radical of the formula

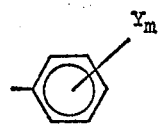

wherein *m* represents an integer of from 0 to 3, both inclusive, and each Y independently represents bromo, chloro, methyl, or methoxy; and each R' independently represents hydrogen or methyl, which method comprises as a first step (1) reacting in a reaction medium a dinitramine compound of the formula

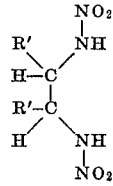

with formaldehyde, thereby obtaining in the reaction medium a corresponding dimethylol product of the formula

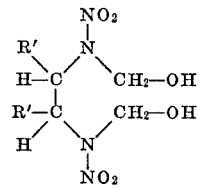

and, as a second step, (2) reacting the said dimethylol compound in the reaction medium essentially simultaneously with
(a) formaldehyde;
(b) ammonia; and
(c) a reactant of the formula H—X—R.

2. The method of claim 1 wherein the dinitramine compound is N,N'-dinitroethylenediamine.

3. The method of claim 1 wherein the reactant of the formula H—X—R is methanol.

4. The method of claim 1 wherein the reactant of the formula H—X—R is ethanol.

5. The method of claim 1 wherein the reactant of the formula H—X—R is benzenethiol.

6. A compound of the formula

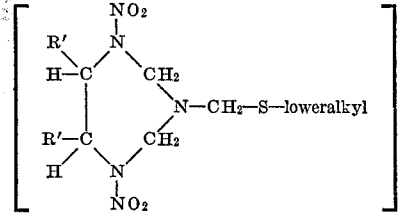

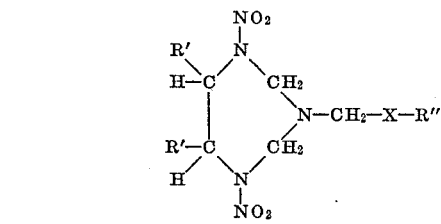

wherein X represents oxygen or sulfur; each R' independently represents hydrogen or methyl; and R" represents allyl, propynyl, cyclohexyl, phenethyl, or a phenyl radical of the formula

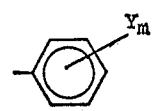

wherein *m* represents an integer of from 0 to 3, both inclusive, and each Y independently represents bromo, chloro, methyl, or methoxy.

7. The compound of claim 6 which is 3-((allyloxy)methyl)-1,5-dinitrohexahydro-1,3,5-triazepine.

8. The compound of claim 6 which is 3-((propynyloxy)methyl)-1,5-dinitrohexahydro-1,3,5-triazepine.

9. The compound of claim 6 which is 3-((cyclohexyloxy)methyl)-1,5-dinitrohexahydro-1,3,5-triazepine.

10. The compound of claim 6 which is 3-((phenylthio)methyl)-1,5-dinitrohexahydro-1,3,5-triazepine.

11. The compound of claim 6 which is 3-(phenethoxymethyl)-1,5-dinitrohexahydro-1,3,5-triazepine.

12. The compound of claim 6 which is 3-((allylthio)methyl)-1,5-dinitrohexahydro-1,3,5-triazepine.

References Cited

Bell et al., J. Chem. Soc. (London), (c), Org. 1966, pp. 862–869.

Conant, Chemistry of Organic Compounds, (New York, 1939), pp. 264—266.

Lowy, et al., Introduction to Organic Chemistry, (New York, 1945), p. 213.

ALTON D. ROLLINS, Primary Examiner

U.S. Cl. X.R.

71—92; 260—584; 424—244